UNITED STATES PATENT OFFICE.

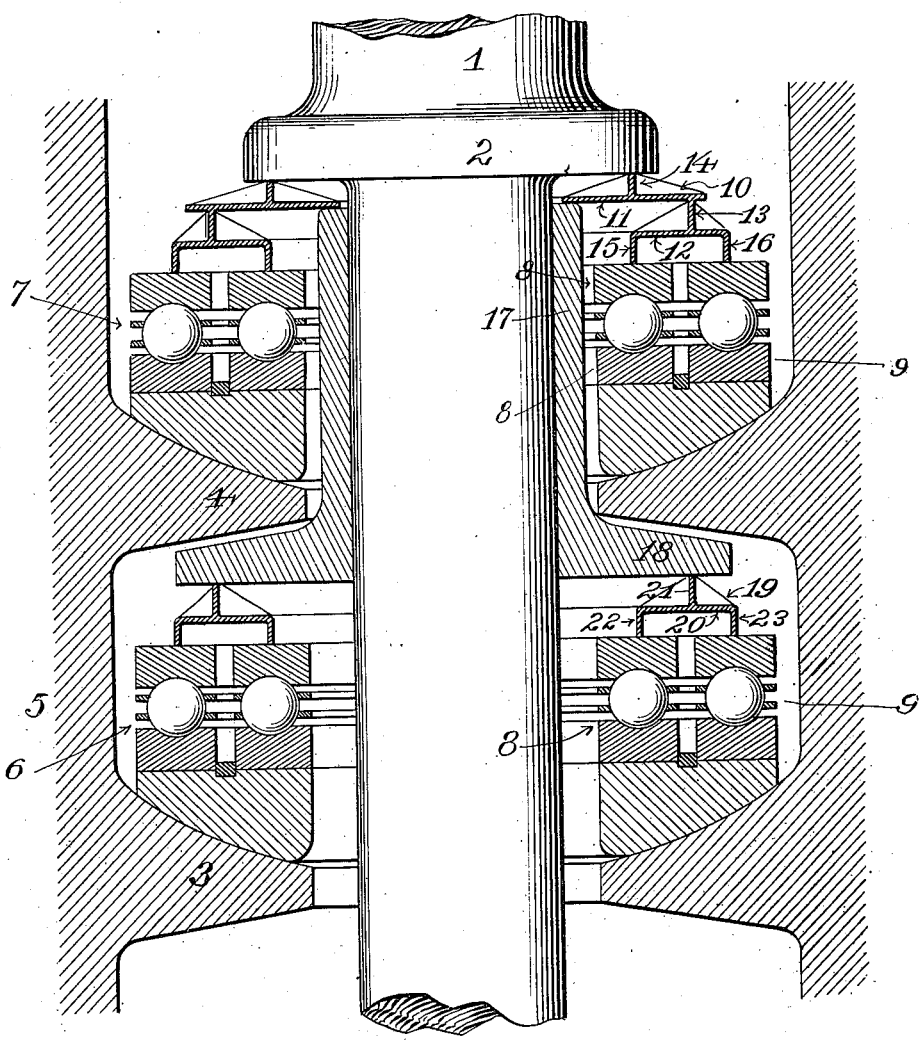

MAX GOHLKE, OF BERLIN, GERMANY.

THRUST-BEARING.

1,137,263.  Specification of Letters Patent.  Patented Apr. 27, 1915.

Application filed November 3, 1911. Serial No. 658,334.

*To all whom it may concern:*

Be it known that I, MAX GOHLKE, a subject of the Emperor of Germany, residing at Berlin, Germany, have invented certain new and useful Improvements in Thrust-Bearings, of which the following is a specification, reference being had therein to the accompanying drawing.

This invention relates to thrust or step bearings in which anti-friction bearings are arranged to receive the thrust loads to which the rotating member or shaft is subjected, the object of the invention being to provide for a distribution or division of the load between a number of bearings so that each bearing will receive only a proportionate amount of the entire load; whereby the individual bearings may be of reduced diameter and size as compared with a single bearing adapted to receive the entire load, and will therefore occupy correspondingly less space.

In its preferred form of embodiment, my invention comprises two sets of bearings arranged one behind the other and each set comprising a plurality of individual bearings, a member loose on the shaft and adapted to distribute the thrust loads to which the member is subjected to the bearings of one set, and an equalizing device adapted to receive the thrust loads of the shaft and arranged to distribute the same between the bearings of the other set and the said loose member. It is manifest, however, that the invention is not limited to such form of embodiment, but may be embodied in other constructions, and it is to be understood that the invention is not limited to any particular form or construction of the parts except in so far as such limitations are specified in the claims.

In the accompanying drawings: the figure represents a longitudinal sectional view through a thrust bearing embodying my invention.

Referring to the drawings: 1 represents a rotary member, in the present instance in the form of a shaft, which is provided with an annular bearing shoulder 2; and 3 and 4 represent fixed supports projecting inwardly from a surrounding frame 5 at different points in the length of the shaft. On the supports are mounted respectively two sets of anti-friction bearings 6 and 7, each set consisting of two individual bearings, an inner one 8 surrounding the shaft and free therefrom, and an outer bearing 9 encircling the inner one and free from the same. These individual bearings may be of any appropriate form and construction, but I prefer to construct each of two annular opposing casing members and a series of anti-friction balls traveling in the raceway between said members.

10 represents an equalizing device whose function is to receive the thrust loads of the shaft and distribute the same to the two sets of bearings. This equalizing device in its preferred form comprises two annular plates 11 and 12, and a connecting web 13, the plate 11 being formed with a central annular web 14, and the plate 12 being provided on its edges with an inner flange 15 and an outer flange 16. This equalizing member surrounds the shaft adjacent the shoulder 2 thereon and is so arranged that its web 14 will be engaged by said shoulder, and the annular flanges 15 and 16 will bear respectively on the individual bearings 8 and 9 of the set 7, the inner edge of the plate 11 bearing against the end of a sleeve 17 loosely encircling the shaft within the bearings 7 and extending toward the other set of bearings. At its extremity, at a point adjacent the set of bearings 6, the sleeve 17 is provided with an annular flange 18 between which and the bearings of the set 6 is arranged a second equalizing device 19, whose function is to distribute the load received by the sleeve between the two bearings of the set 6. This equalizing device is in the form of an annular plate 20 provided with a central annular web 21, bearing against the flange 18 and provided also with annular flanges 22 and 23 bearing respectively against the two bearings of the set 6.

From the construction described it will be seen that the thrust load of the shaft received at the center of the plate 11 of the equalizing device 10 is divided and distributed between the two sets of bearings and is further distributed between the individual bearings of the said sets. On the first division of the load, part is transmitted to the sleeve 18 and part to the plate 12 of the equalizing device 10. The portion of load transmitted to the sleeve 18 is in turn transmitted to and distributed between the individual bearings of the set 6 by means of the plate 20; while the portion of the load transmitted to the plate 12 is in turn transmitted by the flanges thereon and distributed between the individual bearings of the set 7.

In the form of the equalizing device 10 shown, the web 13 between the two plates 11 and 12, joins the plate 12 to one side of its center, with the result that a greater proportion of the load sustained by the said plate will be transmitted to the outer bearing 9, which bearing being of greater diameter is enabled to withstand a correspondingly greater load than the inner bearing. The same is true of the position of the web 21 in relation to the plate 20 of the other equalizing device, the greater portion of the load transmitted to this equalizing device being in like manner imposed upon the outer bearing of the set 6. By therefore varying the point of application of the load to the transmitting plates of the equalizing devices, said load may be properly proportioned with respect to the capacity of the bearings receiving the same.

By reason of the formation of the equalizing devices of annular plates with the central webs, these devices will possess a certain degree of yield or resiliency which adapts them to properly distribute the loads to the bearing. The degree of resiliency or yield may, if desired, be augmented by incising or slotting the plates and flanges from the inner edges outwardly, not extending entirely through the same.

Having thus described my invention, what I claim is:

1. In a thrust bearing, the combination of a shaft, individual antifriction bearings therefor arranged in tandem, a member loose on the shaft and acting on one of said antifriction bearings, and an equalizing device in position to receive the thrust loads of the shaft, said equalizing device acting on said loose member and acting also on the other of said antifriction bearings.

2. In a thrust bearing, the combination of a shaft, two sets of antifriction bearings arranged in tandem and each set comprising a plurality of individual bearings, a member loose on the shaft and acting on the bearings of one set, and an equalizing device in position to receive the thrust loads of the shaft, said equalizing device acting on said loose member and acting also on the bearings of the other set.

3. In a thrust bearing, the combination of a shaft, an antifriction bearing therefor, a member loose on the shaft, an equalizing device in position to receive the thrust loads of the shaft, said equalizing device acting respectively on said loose member and acting also on said antifriction bearing, and means for supporting the load transmitted by the loose member.

4. In a thrust bearing, the combination of a shaft provided with a plurality of bearings, an equalizing device comprising two annular plates and an intermediate annular connecting web, one of the plates being arranged to receive the thrust loads of the shaft and suitably supported inwardly of the point of application of said loads, and the other plate being provided with flanges bearing on the said bearings.

5. In a thrust bearing, the combination of a shaft, a plurality of bearings therefor, and an equalizing device comprising two annular connected plates, one of the plates being suitably supported at its inner edge and arranged in position to receive between its edges the thrust loads of the shaft, and the other plate bearing at its inner and outer edges respectively on said bearings.

6. In a thrust bearing and in combination with a shaft, two sets of bearings therefor arranged one behind the other and each set comprising a plurality of individual bearings, a loose member on the shaft, an equalizing device between said loose member and the bearings of that set, and an equalizing device adapted to receive the thrust loads of the shaft and formed to distribute the same between said loose member and the bearings of the other set.

In testimony whereof I affix my signature in presence of two witnesses.

MAX GOHLKE.

Witnesses:
 HENRY HASPER,
 WOLDEMAR HAUPT.